United States Patent
Dahlberg

(10) Patent No.: US 9,392,779 B1
(45) Date of Patent: Jul. 19, 2016

(54) BATTERY POWERED TIP-UP ICE FISHING LINE WINDER

(71) Applicant: Dennis Dahlberg, Osceola, WI (US)

(72) Inventor: Dennis Dahlberg, Osceola, WI (US)

(*) Notice: Subject to any disclaimer, the term of this patent is extended or adjusted under 35 U.S.C. 154(b) by 103 days.

(21) Appl. No.: 14/521,645

(22) Filed: Oct. 23, 2014

(51) Int. Cl.
*A01K 97/12* (2006.01)
*A01K 89/017* (2006.01)
*A01K 97/01* (2006.01)

(52) U.S. Cl.
CPC ............... *A01K 89/017* (2013.01); *A01K 97/01* (2013.01); *A01K 97/12* (2013.01)

(58) Field of Classification Search
USPC .................................................. 43/26.1, 17
See application file for complete search history.

(56) References Cited

U.S. PATENT DOCUMENTS

| | | |
|---|---|---|
| 3,187,456 A | 6/1965 | Apitz |
| 4,887,777 A | 12/1989 | Rasmussen |
| 4,996,788 A * | 3/1991 | Wieting ................ A01K 97/01 43/17 |
| 5,101,591 A * | 4/1992 | Frazier .................. A01K 97/01 43/17 |
| 7,946,076 B2 | 5/2011 | Gascoigne |
| 2007/0227057 A1* | 10/2007 | Holmberg ............. A01K 97/01 43/17 |
| 2012/0291332 A1* | 11/2012 | Nolf ....................... A01K 97/01 43/17 |

* cited by examiner

*Primary Examiner* — Joanne Silbermann
(74) *Attorney, Agent, or Firm* — Crossley & Stevenson Intellectual Property Law

(57) ABSTRACT

A battery powered motor driven tip-up ice fishing line winder including a tip-up housing body supported by a platform and a U-shaped channel across a lid which retains and releases a spring-loaded flag shaft of a flag adjacent to the housing body to indicate a fish strike. The housing is divided into upper and lower portions with respective cold-resistant, waterproof, and electrical insulating outer and exterior walls. Activation of a forward-reverse sliding switch in the lower portion into alternate forward reverse positions activates the motor, which turns a drive shaft clockwise and counterclockwise, respectively, to turn the line spool on the end of a vertical line shaft in operational communication with the drive shaft in a respective direction thereby extending and retracting the fishing line on the line spool.

4 Claims, 4 Drawing Sheets

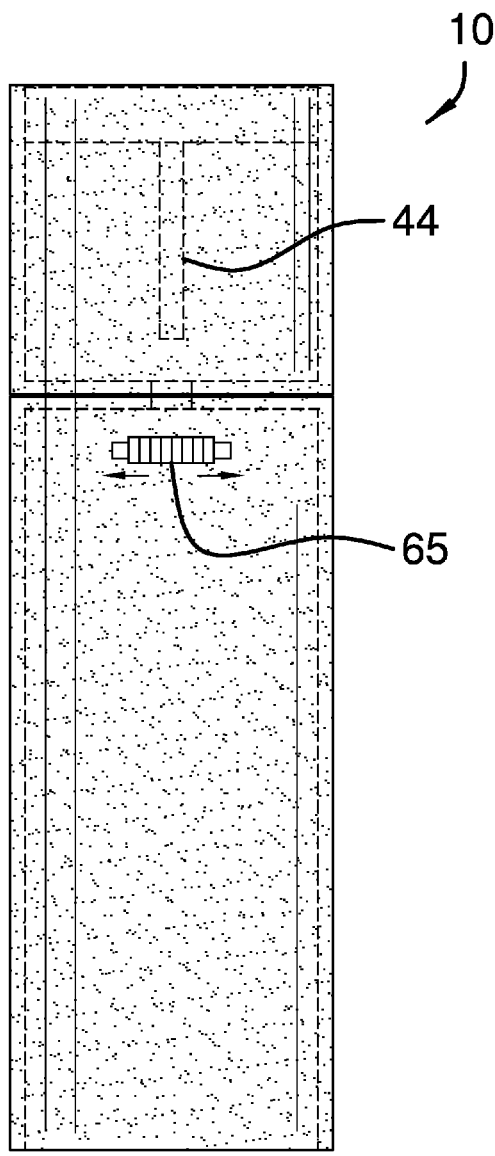
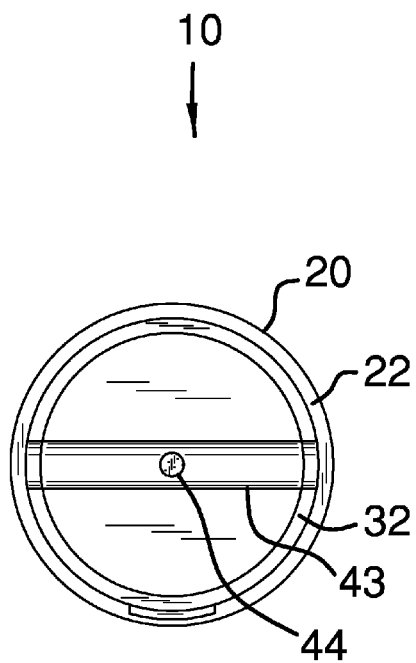
FIG. 2
FIG. 3

BATTERY POWERED TIP-UP ICE FISHING LINE WINDER

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of ice fishing reel winding devices are known in the prior art. The known devices include manually operated winding mechanisms as well as well as other structural features that require the user to wear gloves to operate the device while ice fishing. Other known prior art devices lack fish strike indicators. The present battery powered tip-up ice fishing line winder addresses the foregoing problems by including an ice fishing tip-up housing body having an upper portion and a lower portion with a centrally disposed lid thereon. A U-shaped channel across the lid and an outer end of the upper portion is configured to retain and alternately release the flag shaft therefrom upon a downward movement of the housing body to spring into a vertical position thereby indicating a fish strike. A first shaft hole is centrally disposed through the lid and through the upper portion and a central second shaft hole is longitudinally disposed in the lower portion, respectively. Each of an outer wall of the upper portion, an exterior wall of the lower portion, the lid, and a compartment between the first shaft hole and an inner wall of the upper portion is formed of cold-resistant to allow the user to more easily handle the device without gloves for operation and also waterproof and electrical insulating material to protect internal components contained in the housing body. A battery-powered motor in the lower portion is in operational communication with a drive shaft disposed within the second shaft hole.

A platform is provided to support the housing body in an inverted upright position atop a frozen water surface and has a vertical aperture centrally disposed therethrough. The present device works in conjunction with a line spool which securingly holds an amount of fishing line thereon. A vertical line shaft extending from the line spool has a bottom segment centrally disposed on the line spool, a top segment, and a weight member disposed therebetween proximal a top side of the platform. The line shaft bottom segment engages a bushing in the vertical aperture. The top segment of the line shaft engages the first shaft hole and operationally engages the drive shaft.

Activation of a forward-reverse sliding switch, which is disposed in the lower portion, in a forward position and in an alternate reverse position is configured to activate the motor and turn the drive shaft clockwise and alternately counterclockwise, respectively. The turning of the drive shaft clockwise and alternately counterclockwise rotates the line shaft and, in turn, the line spool in a respective clockwise and counterclockwise direction, to respectively extend and retract the fishing line on the line spool.

FIELD OF THE INVENTION

The present invention relates to the field of ice fishing, and more particularly, to a battery powered tip-up ice fishing line winder which also includes a channel in a lid of a housing body configured to retain and alternately release a flag shaft proximal to the winder to indicate a fish strike.

SUMMARY OF THE INVENTION

The general purpose of the present battery powered tip-up ice fishing line winder, described subsequently in greater detail, is to provide a battery powered tip-up ice fishing line winder which has many novel features that result in a battery powered tip-up ice fishing line winder which is not anticipated, rendered obvious, suggested, or even implied by prior art, either alone or in combination thereof. To accomplish this, the present battery powered tip-up ice fishing line winder includes an ice fishing tip-up housing body having an upper portion and a lower portion with a centrally disposed lid on the upper portion. A U-shaped channel, disposed across the lid and an outer end of the upper portion, is configured to retain and alternately release the flag shaft therefrom upon a downward movement of the housing body to spring into a vertical position thereby indicating a fish strike. A first shaft hole is centrally disposed through the lid and through the upper portion along a longitudinal mid-line axis of the upper portion. A second shaft hole is disposed along a longitudinal mid-line axis of the lower portion. A compartment is disposed between the first shaft hole and the upper portion inner wall.

Each of an outer wall of the upper portion, an exterior wall of the lower portion, the lid, and the compartment is formed of cold-resistant to allow the user to more easily control and handle the device and to do so without gloves and waterproof and electrical insulating material to protect internal components contained in the housing body. The material is preferably rubber. A battery-operated motor is disposed in the lower portion and is in operational communication with a drive shaft disposed within the second shaft hole between the first shaft hole and the motor. A forward-reverse sliding switch, disposed in the lower portion, is in operational communication with the battery and the motor.

A platform is provided to support the housing body in an inverted upright position atop a frozen water surface and has a vertical aperture centrally disposed therethrough A bushing is disposed within the vertical aperture. The present device works in conjunction with a line spool, which securingly holds an amount of fishing line thereon. A vertical line shaft extended from the line spool has a bottom segment centrally disposed on the line spool, a top segment having a smaller diameter than a diameter of the bottom segment, and a weight member disposed between the bottom segment and the top segment in a position proximal a top side of the platform. The line shaft bottom segment engages the bushing. The top segment of the line shaft engages the first shaft hole and operationally engages the drive shaft.

Activation of the forward-reverse sliding switch in a forward position and in an alternate reverse position is configured to activate the motor and turn the drive shaft clockwise and alternately counterclockwise, respectively. The turning of the drive shaft clockwise and alternately counterclockwise rotates the line shaft and, in turn, the line spool in a respective clockwise and counterclockwise direction, to respectively extend and retract the fishing line on the line spool.

Thus has been broadly outlined the more important features of the present battery powered tip-up ice fishing line winder so that the detailed description thereof that follows may be better understood and in order that the present contribution to the art may be better appreciated.

BRIEF DESCRIPTION OF THE DRAWINGS

Figures

FIG. 2 is a front elevation view.
FIG. 3 is a top plan view.

DETAILED DESCRIPTION OF THE DRAWINGS

Figure 1:
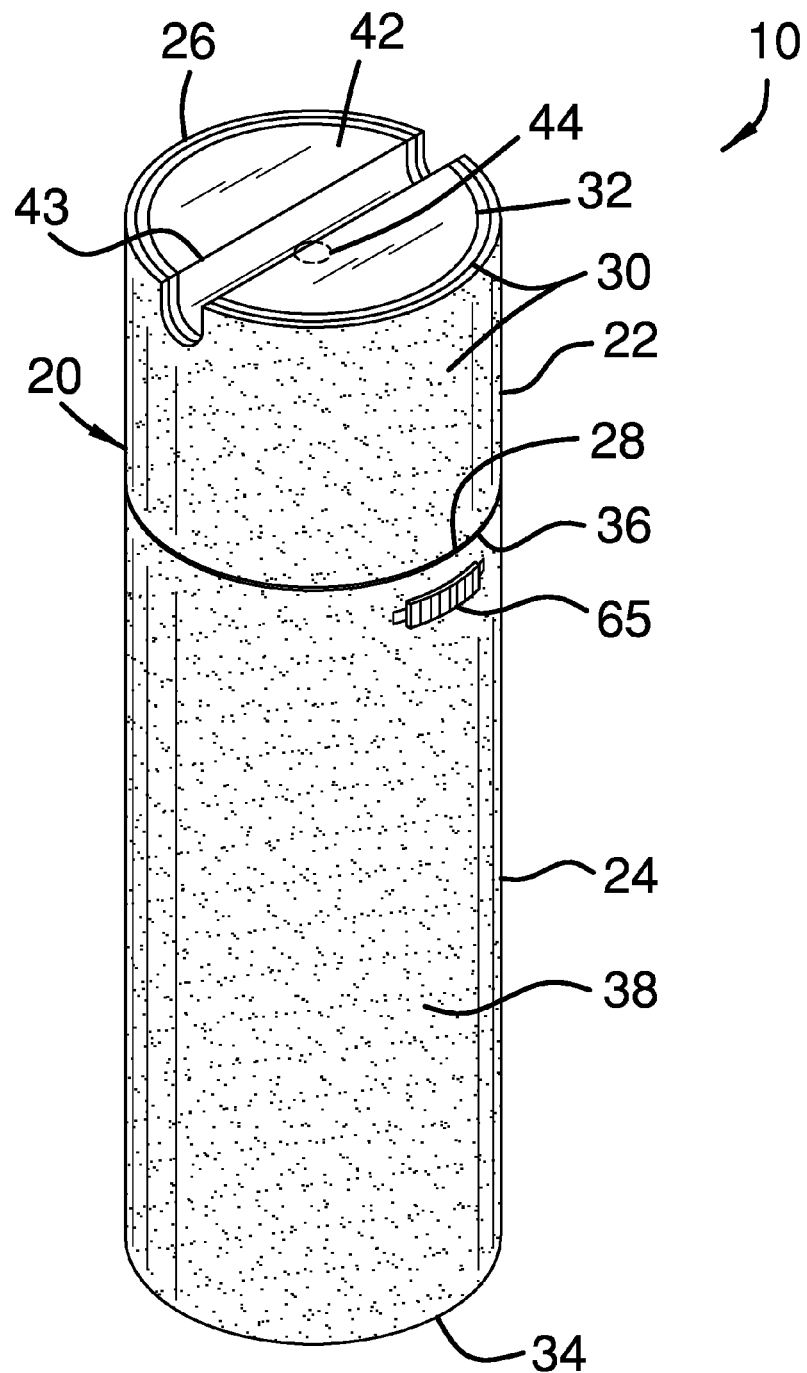
FIG. 1 is an isometric view.
Figure 4:
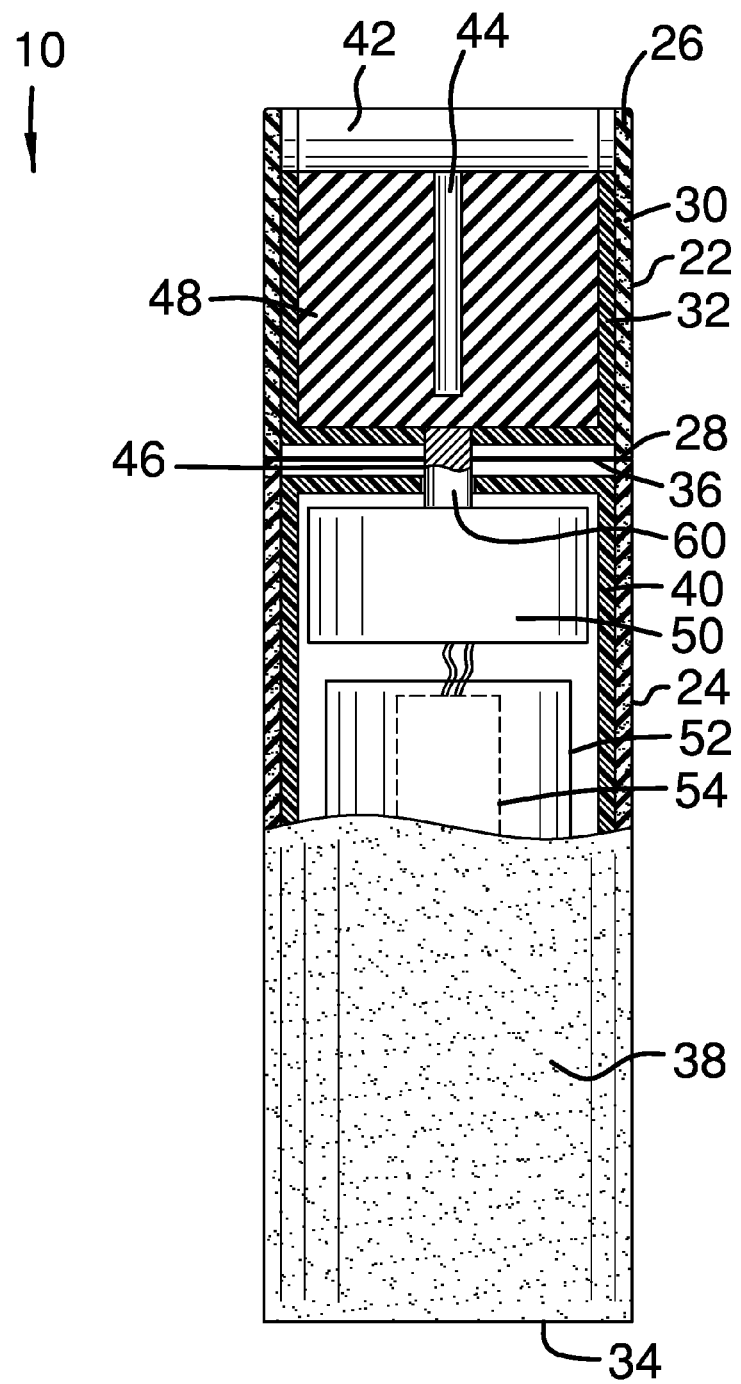
FIG. 4 is a cross-sectional view taken along line 4-4 of FIG. 2.
Figure 5:
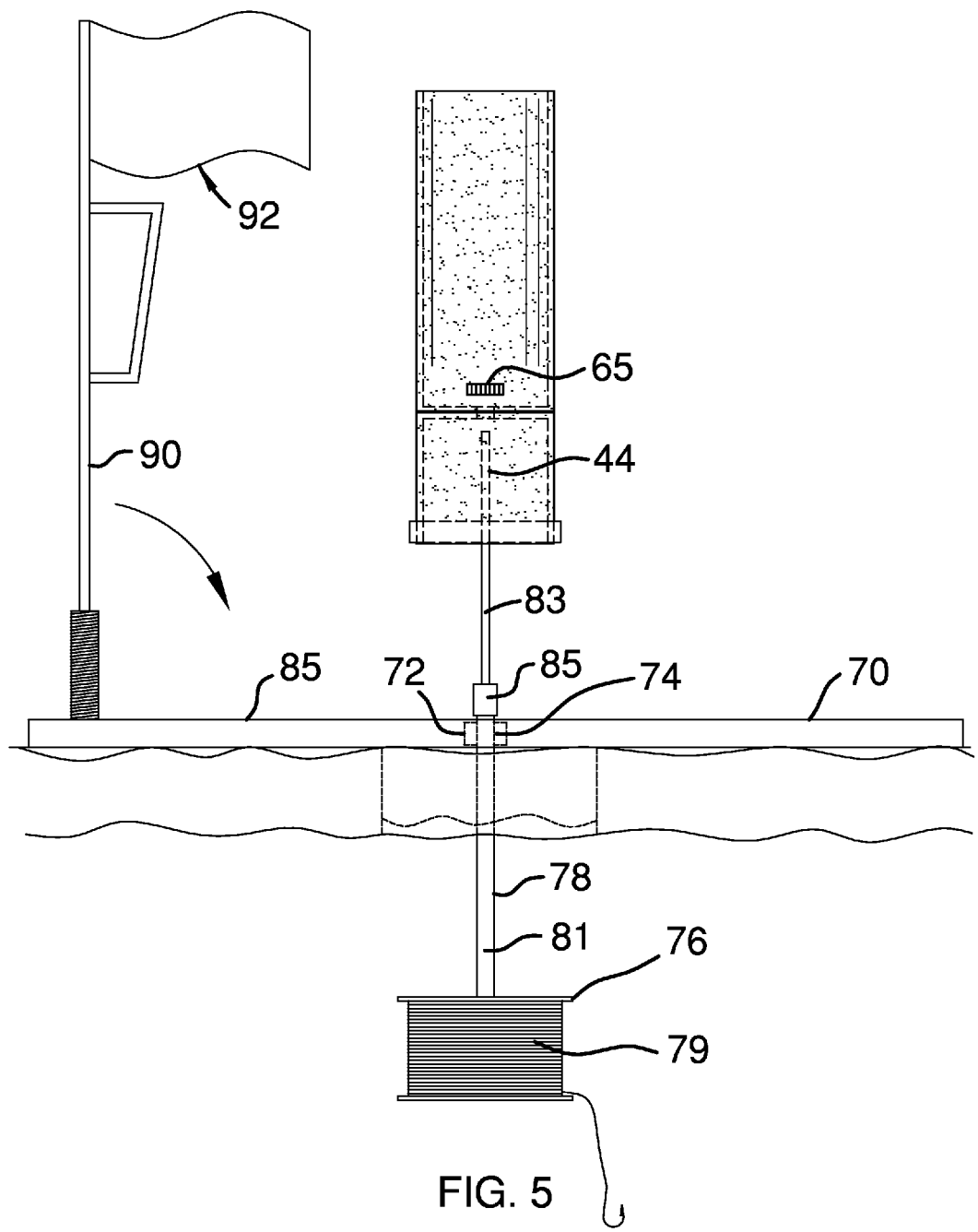
FIG. 5 is an in-use front elevation view.

With reference now to the drawings, and in particular FIGS. 1 through 5 thereof, an example of the instant battery powered tip-up ice fishing line winder employing the principles and concepts of the present battery powered tip-up ice fishing line winder and generally designated by the reference number 10 will be described.

Referring to FIGS. 1 through 5, the present battery powered tip-up ice fishing line winder 10 is illustrated. The battery powered tip-up ice fishing line winder 10 includes an ice fishing tip-up housing body 20. The housing body 20 has an upper portion 22 and a lower portion 24. The upper portion 22 has an outer end 26, an inner end 28, a continuous outer wall 30 between the outer end 26 and the inner end 28, and an inner wall 32 conjoined to the outer wall 30. The lower portion 24 has an exterior end 34, an interior end 36, a continuous exterior wall 38 between the exterior end 32 and the interior end 34, and an interior wall 40 conjoined to the exterior wall 38.

A continuous lid 42 is centrally disposed on the outer end 26 of the upper portion 22. A U-shaped channel 43 is continuously disposed across the lid 42 and the outer end 26. A first shaft hole 44 is centrally disposed through the lid 42 and through the upper portion 22 along a longitudinal mid-line axis of the upper portion 22. A second shaft hole 46 is disposed along a longitudinal mid-line axis of the lower portion 24. A compartment 48 is disposed between the first shaft hole 44 and the upper portion 22 inner wall. Each of the upper portion 22 outer wall 30, the lower portion 24 exterior wall 38, the lid 42, and the compartment 47 is formed of cold-resistant to allow the user to more easily control and handle the device and to do so without gloves and also of waterproof and electrical insulating material to protect internal components contained in the housing body 20. The material is preferably rubber because of rubber's ability to avoid becoming brittle in cold conditions as well as it's waterproof and electrical insulation properties.

A motor 50 is disposed in the lower portion 24 proximal the interior end 36. A battery housing 52 is disposed in the lower portion 24 between the motor 50 and the exterior wall 28. The battery housing 52 is configured to store at least one battery 54 therein. The at least one battery 54 is in operational communication with the motor 50. A drive shaft 60 is disposed with the second shaft hole between the first shaft hole 44 and the motor 50. The drive shaft 60 is in operational communication with the motor 50. A forward-reverse sliding switch 65, disposed in the lower portion 24, is in operational communication with the battery 54 and the motor 50.

A platform 70 is provided to support the housing body 20 in an inverted upright position atop a frozen water surface. A vertical aperture 72 is centrally disposed through the platform 70. A bushing 74 is disposed within the vertical aperture 72. The present device 10 works in conjunction with a line spool 76, which securingly holds an amount of fishing line 79 thereon. A vertical line shaft 78 extending from the line spool 76 has a bottom segment 81 centrally disposed on the line spool 76, a top segment 83 having a smaller diameter than a diameter of the bottom segment 81, and a weight member 85 disposed between the bottom segment 81 and the top segment 83 in a position proximal a top side 85 of the platform 70. The line shaft 78 bottom segment 81 engages the bushing 74 in the vertical aperture 72 in the platform 70. The top segment 83 of the line shaft 78 engages the first shaft hole 44 and operationally engages the drive shaft 60.

The channel 43, described hereinabove, has a diameter configured to receive a flag shaft 90 supporting a spring-loaded flag 92 therethrough. The flag shaft 90 has a diameter substantially the same as a diameter of the bottom segment 81 of the line shaft 78. The channel 43 is configured to release the flag shaft 81 therefrom upon a downward movement of the housing body 20, such as occurs when a fish strikes the fishing line 79, which permits the flag 92 to spring into a vertical position to indicate the fish strike. The activation of the forward-reverse sliding switch 65 in a forward position and in an alternate reverse position is configured to activate the motor 50 and turn the drive shaft 60 clockwise and alternately counterclockwise, respectively. The turning of the drive shaft 60 clockwise and alternately counterclockwise rotates the line shaft 78 and, in turn, the line spool 76 in a respective clockwise and counterclockwise direction, to respectively extend and retract the fishing line 79 on the line spool 76.

What is claimed is:

1. A battery powered tip-up ice fishing line winder comprising, in combination:

an ice fishing tip-up housing body having an upper portion and a lower portion, the upper portion having an outer end, an inner end, a continuous outer wall between the outer end and the inner end, and an inner wall conjoined to the outer wall, the lower portion having an exterior end, an interior end, a continuous exterior wall between the exterior end and the interior end, and an interior wall conjoined to the exterior wall;

a continuous lid centrally disposed on the outer end of the upper portion;

a U-shaped channel continuously disposed across the lid and the outer end;

a first shaft hole centrally disposed through the lid and through the upper portion along a longitudinal mid-line axis of the upper portion;

a second shaft hole disposed along a longitudinal mid-line axis of the lower portion;

a compartment between the first shaft hole and the upper portion inner wall;

a motor disposed in the lower portion proximal the interior end;

a battery housing disposed in the lower portion between the motor and the exterior wall, wherein the battery housing is configured to store at least one battery therein, the at least one battery being in operational communication with the motor;

a drive shaft disposed within the second shaft hole between the first shaft hole and the motor, the drive shaft being in operational communication with the motor;

a forward-reverse sliding switch disposed in the lower portion, the forward-reverse activation switch being in operational communication with the battery and the motor;

a platform configured to support the housing body in an inverted upright position atop a frozen water surface;

a vertical aperture centrally disposed through the platform;

a bushing disposed within the vertical aperture; and a line spool having a vertical line shaft extended therefrom, the line shaft having a bottom segment centrally disposed on the line spool, a top segment having a smaller diameter than a diameter of the bottom segment, and a weight member disposed between the bottom segment and the top segment in a position proximal a top side of the platform, the line shaft bottom segment engaging the bushing in the vertical aperture of the platform, the top segment of the line shaft engaging the first shaft hole and operationally engaging the drive shaft, wherein the line spool is configured to securingly hold an amount of fishing line thereon;

wherein the channel has a diameter configured to receive a flag shaft supporting a spring-loaded flag therethrough, the flag shaft having a diameter substantially the same as a diameter of the bottom segment of the line shaft, wherein the channel is configured to release the flag shaft therefrom upon a downward movement of the housing body, wherein upon release of the flag shaft from the channel, the flag is configured to spring into a vertical position to indicate a fish strike on the fishing line;

wherein the activation of the forward-reverse sliding switch in a forward position and in an alternate reverse position is configured to activate the motor and turn the drive shaft clockwise and alternately counterclockwise, respectively; and wherein the turning of the drive shaft clockwise and alternately counterclockwise rotates the line shaft and, in turn, the line spool in a respective clockwise and counterclockwise direction to respectively extend and retract the fishing line on the line spool.

2. The battery powered tip-up ice fishing line winder of claim 1 wherein each of the upper portion outer wall, the lower portion exterior wall, the lid, and the compartment is formed of cold-resistant, waterproof, and electrical insulating material.

3. The battery powered tip-up ice fishing line winder of claim 2 wherein the material is rubber.

4. A battery powered tip-up ice fishing line winder comprising, in combination:

an ice fishing tip-up housing body having an upper portion and a lower portion, the upper portion and the lower portion, the upper portion having an outer end, an inner end, a continuous outer wall between the outer end and the inner end, and an inner wall conjoined to the outer wall, the lower portion having an exterior end, an interior end, a continuous exterior wall between the exterior end and the interior end, and an interior wall conjoined to the exterior wall;

a continuous lid centrally disposed on the outer end of the upper portion;

a U-shaped channel continuous disposed across the lid and the outer end;

a first shaft hole centrally disposed through the lid and through the upper portion along a longitudinal mid-line axis of the upper portion;

a second shaft hole disposed along a longitudinal mid-line axis of the lower portion;

a compartment between the first hole shaft and the upper portion inner wall;

a motor disposed in the lower portion proximal the interior end;

a battery housing disposed in the lower portion between the motor and the exterior wall, wherein the battery housing is configured to store at least one battery therein, the at least one battery being in operational communication with the motor;

a drive shaft disposed within the second shaft hole between the first shaft hole and the motor, the drive shaft being in operational communication with the motor;

a forward-reverse sliding switch disposed in the lower portion, the forward-reverse activation switch being in operational communication with the battery and the motor;

a platform configured to support the housing body in an inverted upright position atop a frozen water surface;

a vertical aperture centrally disposed through the platform;

a bushing disposed within the aperture; and a line spool having a vertical line shaft extended therefrom, the line shaft having a bottom segment centrally disposed on the line spool, a top segment having a smaller diameter than a diameter of the bottom segment, and a weight member disposed between the bottom segment and the top segment in a position proximal a top side of the platform, the line shaft bottom segment engaging the vertical aperture and the bushing in the platform, the top segment of the line shaft operationally engaging the drive shaft, wherein the line spool is configured to securingly hold an amount of fishing line thereon;

wherein the channel has a diameter configured to receive a flag shaft supporting a spring-loaded flag therethrough, the shaft supporting the flag having a diameter substantially the same as a diameter of the bottom segment of the line shaft, wherein the shaft is configured to release the flag shaft therefrom upon a downward movement of the housing body, wherein upon release of the flag shaft from the channel, the flag is configured to spring into a vertical position to indicate a fish strike on the fishing line;

wherein the activation of the forward-reverse sliding switch in a forward position and in an alternate reverse position is configured to activate the motor and turn the drive shaft clockwise and alternately counterclockwise, respectively;

wherein the turning the of the drive shaft clockwise and alternately counterclockwise rotates the line shaft and, in turn, the line spool in a respective clockwise and counterclockwise direction to respectively extend and retract the fishing line on the line spool;

wherein each of the upper portion outer wall, the lower portion exterior wall, the lid, and the compartment is formed of cold-resistant, waterproof, and electrical insulating material; and wherein the material is rubber.

\* \* \* \* \*